I. W. Shaler,
Clothes Sprinkler,
Nº 63,107.                    Patented Mar. 19, 1867.
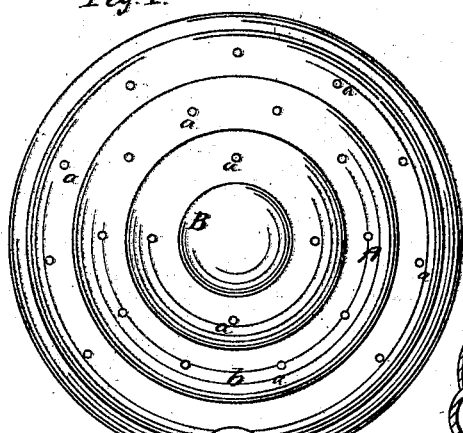
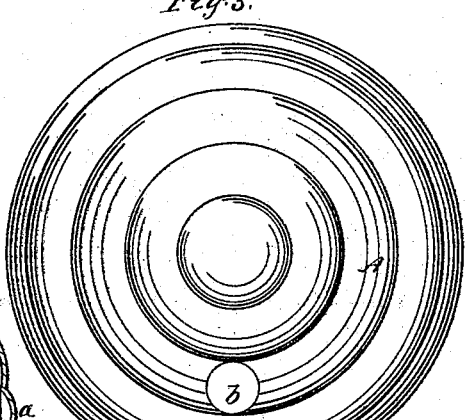
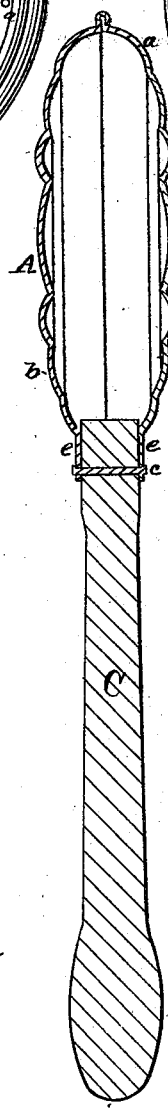
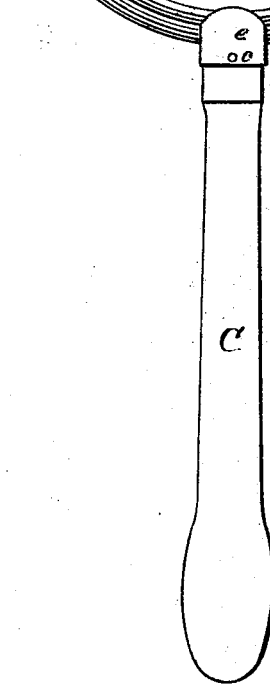
Witnesses
H. Wickham Hoee
R. H. Seaton
Inventor
Ira W. Shaler
By How & Weston
Attys

United States Patent Office.

IRA W. SHALER, OF BROOKLYN, NEW YORK.

Letters Patent No. 63,107, dated March 19, 1867.

---

IMPROVED CLOTHES SPRINKLER.

---

*The Schedule referred to in these Letters Patent and making part of the same.*

---

Specification of an Improved Clothes Dampener invented by IRA W. SHALER, of Brooklyn, in the county of Kings, and State of New York.

My invention consists of a vessel or cup for containing a supply of water for sprinkling the clothes in order to dampen them, which cup is made by striking up two pieces of metal, one for the top and the other for the bottom, and it is furnished with a handle which is inserted in a socket made for its reception by striking up a portion of each of the pieces of metal from which the sides of the cup are formed, and it is fastened in its place by a pin or rivet, which passes through the said handle and through the sides of the said socket. One side of the cup is perforated more or less closely with small holes, for the purpose of permitting the water to escape in a minutely divided state. The other side has a hole, about one-third or one-fourth of an inch in diameter, through it, near the handle, for the purpose of filling it and of admitting the air as the water escapes. In the accompanying drawings —

Figure 1 is a bottom view of the dampener, showing the holes through which the water escapes.

Figure 2 is a longitudinal vertical section of the dampener.

Figure 3 is a top view of the same.

A is the top of the dampener; B the bottom, and C the handle. The bottom, B, is perforated with small holes, $a\ a\ a$, to permit the water to escape for the purpose of sprinkling the clothes in order to dampen them. A hole, $b$, is made in the top-piece, A, through which the water to fill the cup is introduced, and also to admit the air to the inside of the dampener, in order that the pressure of the air on the bottom may not prevent the water from running out through the small holes $a\ a\ a$. If, however, it is found that the water runs out too fast, it may be checked by covering the hole $b$ with the thumb or finger, thus regulating the flow. The sides of the cup of the dampener are corrugated, for the purpose of stiffening them, and thus admitting of the use of thinner metal than would otherwise be practicable, which cheapens the article. A socket, $e$, for the handle is formed by striking up one-half of it from a portion of each of the pieces of metal of which the sides of the dampener are formed, one side of the cup or vessel and the corresponding side of the socket being of one piece of metal. The handle C is fastened into the socket $e$ by a pin or rivet, $c$, which passes through the handle and through the sides of the socket, being riveted securely in its place. The dampener thus constructed is very simple, cheap, and effective, consisting of but four pieces: the sides A and B, (which also form the socket $e$,) the handle C, and the pin or rivet $c$. The sides A and B are first fastened together, and the handle C is then inserted in the socket $e$, and the rivet $c$ put in and riveted fast, which completes the manufacture.

In using this dampener, it is best to have a bowl or other vessel with water in it near by, into which it is dropped when not in use. The water enters the hole $b$, filling the cavity or cup of the dampener; and when it is to be used the operator grasps the handle C and places a finger upon the hole $b$, thus preventing almost entirely the escape of water through the holes $a\ a\ a$, and, shaking off the water which adheres to the outside of the dampener, carries it over the clothes which are to be dampened, then removes the finger from the hole $b$, and shakes the water out through the holes $a\ a\ a$, and thus dampens the clothes evenly and in an expeditious manner.

Having thus fully described my invention, I claim—

As a new article of manufacture, the dampener described, when constructed substantially as set forth.

IRA W. SHALER.

Witnesses:
R. H. SEATON,
THOS. P. HOW.